(12) United States Patent
McCuller (10) Patent No.: US 8,359,200 B2
(45) Date of Patent: Jan. 22, 2013

(54) GENERATING PROFILES OF WORDS

(75) Inventor: Patrick McCuller, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 0 days.

(21) Appl. No.: 13/241,057

(22) Filed: Sep. 22, 2011

(65) Prior Publication Data

US 2012/0007793 A1  Jan. 12, 2012

Related U.S. Application Data

(63) Continuation of application No. 11/102,519, filed on Apr. 8, 2005, now Pat. No. 8,050,924.

(51) Int. Cl.
*G10L 15/04* (2006.01)

(52) U.S. Cl. .................................................. 704/254

(58) Field of Classification Search .................. 704/254
See application file for complete search history.

(56) References Cited

U.S. PATENT DOCUMENTS

| | | | |
|---|---|---|---|
| 5,621,859 A | 4/1997 | Schwartz et al. | |
| 6,275,789 B1 | 8/2001 | Moser et al. | |
| 6,304,844 B1 | 10/2001 | Pan et al. | |
| 7,124,082 B2 | 10/2006 | Freedman | |
| 7,142,843 B2 * | 11/2006 | Dowling et al. | 455/414.1 |
| 7,149,690 B2 | 12/2006 | August et al. | |
| 7,263,484 B1 | 8/2007 | Cardillo et al. | |
| 7,286,987 B2 | 10/2007 | Roy | |
| 7,313,521 B1 | 12/2007 | Cardillo et al. | |
| 7,340,393 B2 | 3/2008 | Mitsuyoshi | |
| 7,343,289 B2 | 3/2008 | Cutler et al. | |
| 7,356,468 B2 | 4/2008 | Webster | |
| 7,398,199 B2 | 7/2008 | Gong | |
| 7,430,503 B1 | 9/2008 | Walker | |
| 7,454,430 B1 | 11/2008 | Komissarchik et al. | |
| 7,467,087 B1 | 12/2008 | Gillick et al. | |
| 7,478,047 B2 | 1/2009 | Loyall et al. | |
| 2002/0046050 A1 * | 4/2002 | Nakazawa et al. | 705/1 |
| 2003/0103088 A1 * | 6/2003 | Dresti et al. | 345/835 |
| 2003/0229900 A1 * | 12/2003 | Reisman | 725/87 |
| 2004/0031058 A1 * | 2/2004 | Reisman | 725/112 |
| 2004/0102201 A1 * | 5/2004 | Levin | 455/466 |
| 2004/0185842 A1 * | 9/2004 | Spaur et al. | 455/420 |
| 2005/0267755 A1 | 12/2005 | Suontausta | |

FOREIGN PATENT DOCUMENTS

EP  000488492  * 6/1992

OTHER PUBLICATIONS

Supplementary European Search Report issued in European Application No. 06740550.6 on Sep. 18, 2008, 32 pages.
International Search Report and Written Opinion dated Oct. 24, 2007, issued in PCT/US06/12645, 8 pages.

* cited by examiner

*Primary Examiner* — Michael N Opsasnick
(74) *Attorney, Agent, or Firm* — Sony Corporation of America (57) ABSTRACT

Generating a profile of a word, including: receiving the word including at least one phoneme; determining the at least one phoneme in the word; selecting at least one characteristic for each of the determined at least one phoneme in the word using a dictionary of sound symbolism rules; and generating the profile of the word by combining all of the selected at least one characteristic for the at least one phoneme.

14 Claims, 5 Drawing Sheets

GENERATING PROFILES OF WORDS

CROSS-REFERENCE TO RELATED APPLICATIONS

This application is a continuation application of a U.S. patent application Ser. No. 11/102,519, filed Apr. 8, 2005 (now U.S. Pat. No. 8,050,924, issued on Nov. 1, 2011), entitled "SYSTEM FOR GENERATING AND SELECTING NAMES," which is incorporated herein by reference.

BACKGROUND

In the field of sound symbolism and phonesthemes, research has found that some phonemes suggest certain characteristics. (See, e.g., "Evidence for Pervasive Synesthetic Sound Symbolism in Ethnozoological Nomenclature" by Brent Berlin in *Sound Symbolism* (L. Hinton, J. Nichols, and J. J. Ohala (eds.); published by Cambridge University Press; pages 76-93).) Interestingly, some suggestions appear to be culture- and language-independent. When a name of an item includes a suggestive phoneme, the name tends to cause a listener to develop assumptions about the item. If a name is selected that includes the proper suggestive phonemes, that name often "sounds right" to a listener. For example, evidence indicates that, in most or all languages, bird names usually contain high-frequency sounds, such as high front vowels and consonants with high frequency bursts. In contrast, mammals and fish names tend not to include these sounds. Therefore, when creating a name for a bird, it is more likely that an appropriate sounding name will result by including these bird-suggestive sounds.

SUMMARY

The present invention provides methods and apparatus for implementing the generation of names. In one implementation, a system for generating a name includes: a user interface that receives user input including values for corresponding characteristics and name lengths; a rule dictionary that indicates one or more rules, each rule indicating a relationship between a phoneme and a characteristic; a phoneme selector that selects a phoneme using a value for a characteristic received through said user interface and a rule corresponding to that characteristic; a phoneme compiler that combines selected phonemes to form a name, wherein said name includes a number of letters based on said name length; storage storing data, including data representing said user input and said rule dictionary; and a processor for executing instructions providing said user interface, said first phoneme selector, said second phoneme selector, and said phoneme compiler.

In another implementation, a method of generating a name includes: receiving a selection of one or more characteristics; selecting a phoneme for each selected characteristic using a dictionary of sound symbolism rules; and combining the selected phonemes to form a name.

Other features and advantages of the present invention will become more readily apparent to those of ordinary skill in the art after reviewing the following detailed description and accompanying drawings.

DETAILED DESCRIPTION

The present invention provides methods and apparatus for implementing the generation of names. In one implementation, a computer system generates a name based on user input indicating characteristics of an item to be named and a name length. The computer system applies a set of phoneme rules to the user input to select phonemes appropriate for the indicated characteristics. The computer system then combines the selected phonemes with additional phonemes to reach a target name length. The resulting combination is output as a suggested name.

An illustrative example describing one implementation is presented below. This example is not exhaustive and additional implementations, examples, and variations are also described later.

In one example, a computer system stores and executes a name generating application program (a "name generator"). The name generator is designed to generate a name based on characteristic values provided by a user. To name an item (e.g., a creature in a computer game), a user provides characteristic values to the name generator reflecting the characteristics of the item. The name generator uses the characteristic values to build a name including appropriate phonemes that suggest those characteristics at the appropriate level.

The name generator includes or has access to a dictionary of sound symbolism rules that correlates characteristics and phonemes. A rule for a particular characteristic indicates an ordered sequence of phonemes. One end of the list indicates a phoneme that is highly suggestive of the characteristic. The other end indicates a phoneme that does not suggest the characteristic or suggests an opposite characteristic. To select a phoneme representing a characteristic to a particular degree, the name generator selects a phoneme from the list for that characteristic at an appropriate position in the list. The name generator can then use a combination of appropriate phonemes to build a name suggesting the desired characteristics.

Initially, when a user activates the name generator, the name generator requests a value for each of one or more characteristics (allowing a user to select or omit characteristics). The characteristics are to represent qualities of the item to be named. Each characteristic is a range from one extreme to another, such as "sharp and pointy" to "round." The value is a number from one to ten (other scales can also be used) representing where the item falls in the characteristic. For example, if 1 represents very female and 10 represents very male, an item with a value of 8 in this characteristic would have a highly male character.

The name generator also requests a name length. The name length indicates a number of letters that the resulting name should have.

After receiving the requested input, the name generator selects a suggestive phoneme for each characteristic that has been rated. The name generator uses the supplied values to select phonemes from the phoneme lists in the sound symbolism dictionary. The name generator selects additional filler phonemes to meet the number of letters indicated by the input name length (e.g., by random selection).

After selecting the phonemes, the name generator selects letters for the phonemes to match the name length. The name generator can use alternate spellings to assist in matching the name length. The name generator combines the selected letters to form a name. The name generator can combine the letters in random combinations or according to letter placement rules (such as "i before e except after c"). If the user does not like the generated name, the user can request that the name generator generate a new name. The name generator will then generate a new name using the same suggestive phonemes and new filler phonemes.

In this example, a user can easily cause the name generator to generate a name for an item by describing characteristics of the item. The use of sound symbolism produces names with a better "feel" and with good variety. In situations where many names are needed (e.g., for naming many objects and characters in a game or story), the name generator can provide a convenient and effective tool for selecting appealing names quickly.

Figure 1A:
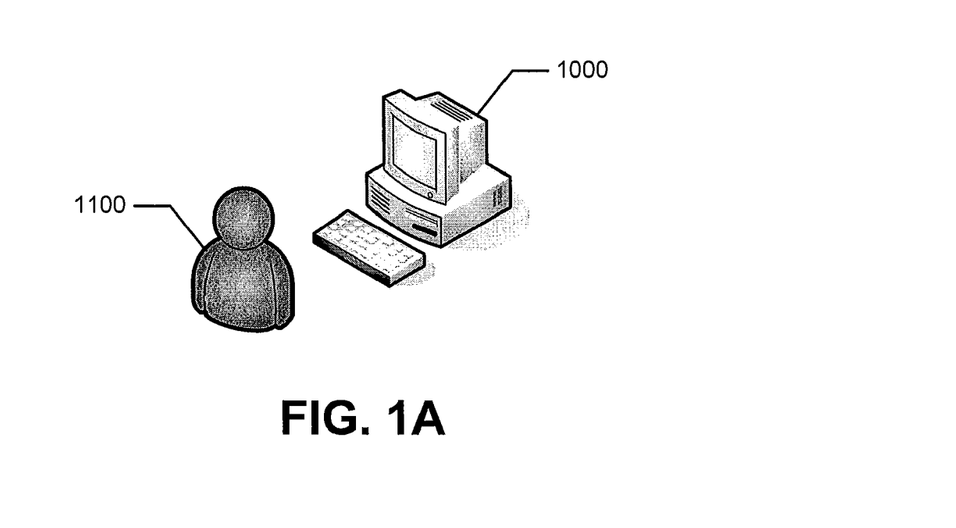
FIG. 1A shows a representation of a computer system and a user.

Referring now to the figures, FIG. 1A shows a representation of a computer system 1000 and a user 1100. The user 1100 can use the computer system 1000 to generate a name.

Figure 1B:
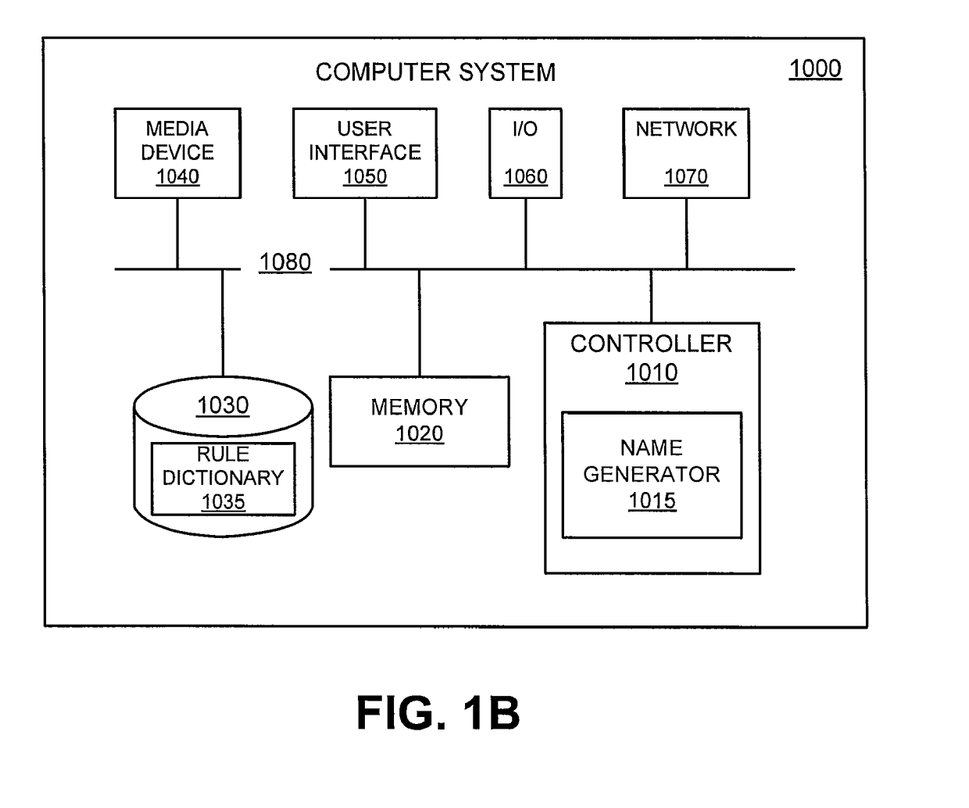
FIG. 1B shows a block diagram of one implementation of the computer system in FIG. 1A, including a name generator.

FIG. 1B shows a block diagram of one implementation of the computer system 1000 in FIG. 1A, including a name generator. The computer system 1000 includes a controller 1010, a memory 1020, storage 1030, a media device 1040, a user interface 1050, an input/output (I/O) interface 1060, and a network interface 1070. These components are interconnected by a common bus 1080. Alternatively, different connection configurations can be used, such as a star pattern with the controller at the center.

The controller 1010 is a programmable processor and controls the operation of the computer system 1000 and its components. The controller 1010 loads instructions from the memory 1020 or an embedded controller memory (not shown) and executes these instructions to control the system. In its execution, the controller 1010 provides a name generator 1015 as a software system. Alternatively, this service can be implemented as separate components in the controller 1010 or the computer system 1000. The name generator 1015 generates names using user input received through the user interface 1050 and phonemic rules retrieved from a rule dictionary 1035 in storage 1030.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data temporarily or long term for use by the other components of the computer system 1000, such as for storing selected phonemes and generated names. In one implementation, storage 1030 is a hard disk drive. Storage 1030 stores one or more phonemic rule dictionaries 1035. A rule dictionary 1035 includes a set of one or more rules relating characteristics to phonemes (described further below). Storage 1030 can also store additional information for use by the name generator 1015, such as language dictionaries (e.g., for phoneme availability and placement, for letters, characters, or symbols), or restriction dictionaries (e.g., cultural, country, and language restrictions for filtering based on cultural taboos, or legal restrictions to filter names for trademarks), and so on. Some or all of this other information can be integrated into the rule dictionary or dictionaries.

The media device 1040 receives removable media and reads and/or writes data to the inserted media. In one implementation, the media device 1040 is an optical disc drive. In one implementation, the computer system 1000 reads from a rule dictionary (or a set of dictionaries) stored on an article of media in the media device 1040 and uses the rules in the name generator 1015.

The user interface 1050 includes components for accepting user input from a user of the computer system 1000 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (802.11) supporting an Ethernet connection.

The computer system 1000 includes additional hardware and software typical of computer systems (e.g., power, cooling, operating system), though these components are not specifically shown in FIG. 1B for simplicity. In other implementations, different configurations of the computer system can be used (e.g., different bus or storage configurations or a multi-processor configuration).

Figure 2:
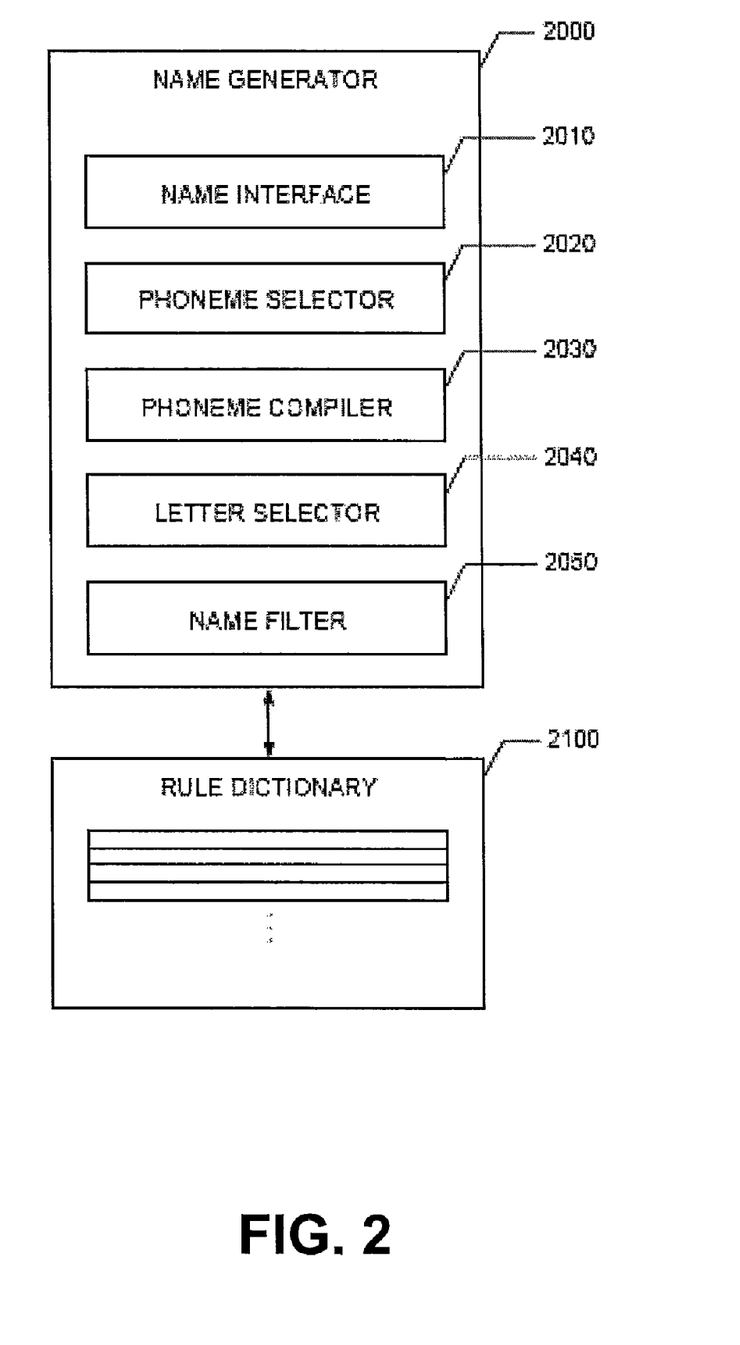
FIG. 2 shows a representation of one implementation of a name generator and a rule dictionary as functional blocks.

FIG. 2 shows a representation of one implementation of a name generator 2000 and a rule dictionary 2100 as functional blocks. The name generator 2000 can be implemented as one or more software components loaded and executed by the processor of a computer system (e.g., controller 1010 in FIG. 1B). The name generator 2000 includes a name interface 2010, a phoneme selector 2020, a phoneme compiler 2030, a letter selector 2040, and a name filter 2050. These components of the name generator 2000 can be implemented as separate elements or integrated as functional divisions of one or more components. The rule dictionary 2100 can be implemented as data stored in a storage system or media as organized associations, such as one or more tables in a database. In another implementation, the rule dictionary is integrated with the name generator.

As discussed above, certain sounds evoke a sense of certain characteristics. Using this knowledge, a set of relationships can be defined correlating characteristics and phonemes as rules. These rules can be used by a name generator to build names designed to evoke desired characteristics. For example, one rule relates the characteristic "soft" to an ordered set of phonemes, arranged from the phoneme evoking the least soft sense to that with the softest sense. Another example of a rule relates two opposite characteristics to a set of phonemes, such as relating "soft-hard" to an ordered set of phonemes arranged from softest to hardest. Some example associations include:

Male: front vowel phonemes: /ē/, /i/, /e/, /ā/, /a/, /ō/ (most to least)
Female: back vowel phonemes: /ō/, /o/, /ä/, /u/, /ü/ (least to most)
Male-Female: /ē/, /i/, /e/, /ā/, /a/, /ō/, /o/, /ä/, /u/, /ü/
Bird: high-frequency bursting sounds and high front vowels
Sharp, Dangerous: sharp inflection
Soft, Smooth, Safe: soft, murmuring sounds
Large: large, expansive mouth movement sounds
Small: small, closed mouth movement sounds
Clear-Unclear: high front vowels-low back vowels Light-Dark: high front vowels-low back vowels
Verbs, Actions: consonants
Nouns, Objects, Ideas: vowels Numerous additional examples of these associations of characteristics and phonemes are documented in research in the area of sound symbolism and phonesthemes. A rule dictionary for a name generator organizes these associations into a searchable collection. In FIG. 2, the rule dictionary 2100 is a database table having entries for rules, each entry having a field for a characteristic and a field for a set of one or more phonemes. In one implementation, each characteristic (e.g., male) or characteristic pair (e.g., male-female) has an ordered list of phonemes. Other implementations can use other arrangements (e.g., one phoneme per characteristic, or an unordered set).

The name generator 2000 receives user input data through the name interface 2010 indicating characteristics for a desired name and configuration data indicating how to arrange the name.

Name characteristics are qualities that the object or concept to be named include and so should be evoked by the name. Examples of name characteristics include, but are not limited to: male, female, soft, hard, light, dark, round, angular, sharp, smooth, clear, obscure, small, large, active, still, fixed, animal types, temperatures, cultures, accents, genre (e.g., science fiction vs. fantasy), and so on. In one implementation, the name characteristics available in the name interface 2010 are the same characteristics as those in the rule dictionary 2100 and so each name characteristic corresponds to one rule. In another implementation, the name characteristics are different from the characteristics in the rule dictionary 2100 (e.g., a name's characteristics corresponds to multiple rules). The name interface 2010 accepts a selection of one or more name characteristics (e.g., using checkboxes or a list). The name interface also accepts a value or weight for each selected name characteristic, such as a value in the range of 1 to 10 where 1 indicates not like that characteristic and 10 indicates very much like that characteristic. Alternatively, a simple choice of selected or not selected can be used. Some characteristics can also be characteristic pairs (e.g., male-female) and the value represents a position in a range between the two ends, such as a range of 1 to 10 where 1 and 10 represent ends of a characteristic pair, such as male-female.

Configuration data for a name provides additional information on how to build a name using selected phonemes, such as a target length (e.g., a number of letters or phonemes, or a relative value such as "long" or "short"), one or more target languages (e.g., American English, Mandarin, etc.), one or more target cultures or countries, and phonemic weight (e.g., indicating which characteristics have higher priority for placement and discarding). When multiple target languages are selected, the name generator 2000 generates a different version of a name for each selected language (e.g., using the same phonemes and appropriate letters, or also altering phoneme selection for language). Similarly, when multiple countries are selected, the name generator 2000 generates different versions of a name for the selected countries where appropriate (e.g., when cultural rules indicate different phonemes should be selected).

In one implementation, the name interface 2010 is implemented as a window in a graphical user interface including a series of graphical controls for inputting name information. For example, one version of such a window includes a slider for each of a set of name characteristics to select a degree or level for each characteristic (including a setting for no selection, such as a checkbox), a text input field for name length, and a drop-down menu for selecting a target language and country. In another implementation, the name interface accepts from a user a description of characteristics or of an object and automatically selects characteristics and values from that description.

The phoneme selector 2020 selects a phoneme for each selected name characteristic. The phoneme selector 2020 selects from the rule dictionary the rule corresponding to the selected name characteristic. As discussed above, the rule indicates one or more phonemes. The phoneme selector 2020 selects one of the indicated phonemes using the value or weight received for that name characteristic. For example, if the rule indicates 10 phonemes in an ordered list and the received value is 6, the phoneme selector 2020 selects the $6^{th}$ phoneme. If two or more selected characteristics indicate the same phoneme, the phoneme is used once. Alternatively, the phoneme can be repeated, depending on target length information. In one implementation, the phoneme selector 2020 checks each selected phoneme to confirm that the phoneme is present in the target language (e.g., by referring to a phoneme list for the language) and selects a new phoneme if the phoneme is not available.

The phoneme compiler 2030 builds a name from the selected phonemes using received configuration information. If the configuration information indicates a target length that is not met by the selected phonemes, the phoneme compiler selects additional filler phonemes to meet the length. In one implementation, the target length indicates a number of phonemes and the phone compiler 2030 selects additional phonemes to reach the target length. The phoneme compiler 2030 selects the additional phonemes using a pseudo-random selection process, applying a filter to avoid selecting filler phonemes that would contradict the characteristics of phonemes selected for the indicated name characteristics (or leaving the filtering to the name filter 2050). In another implementation, the phoneme compiler uses Markov chains to select or adjust the selection of filler phonemes based on previously selected phonemes and the resulting Markov probabilities for succeeding phonemes. If the target length is less than the number of selected phonemes, the phoneme compiler 2030 eliminates selected phonemes (e.g., using configuration information indicating relative weight or priority of name characteristics, or by querying the user for such information). Alternatively, the phoneme compiler can replace multiple phonemes with a single phoneme. In another implementation, the target length indicates a relative value (e.g., "long") and the phoneme compiler uses a defined value or range to establish a target length (or range). In another implementation, the target length indicates a number of letters in the target language and the phoneme compiler does not select filler phonemes but instead defers to the letter selector to select filler letters.

After selecting phonemes, the phoneme selector 2030 arranges the selected phonemes in order. In one implementation, the phoneme compiler 2030 uses phonemic weight information from the configuration information to determine phoneme placement within the name (e.g., placing more important phonemes at the beginning of a name). The phoneme compiler 2030 also uses spelling rules for the target language in arranging the phonemes (e.g., how many and which consonant or vowels may be in immediate sequence). The phoneme compiler can also use sound symbolism information to place phonemes (e.g., placing a certain phoneme at a particular position enhances a selected characteristic). The phoneme compiler can also use Markov chains to adjust the arrangement of phonemes based on Markov probabilities. Remaining phonemes are placed using a pseudo-random order. Alternatively, the phoneme compiler 2030 uses a pseudo-random order to place all the selected phonemes, or selects them from an external dictionary.

The letter selector 2040 selects letters for the selected phonemes using received configuration information. The letter selector 2040 selects and arranges letters from the indicated (or default) target language using the spelling rules of that language for the selected sequence of phonemes. The letters are appropriate to the language (e.g., Roman, Cyrillic, Chinese characters, etc.). In one implementation, the letter selector uses Markov chains to select or adjust the selection of letters based on previously selected letters and the resulting Markov probabilities for succeeding letters. In one implementation, the letter selector also uses sound symbolism to select letters. For example, in a language where two letters or letter combinations have the same phonetic reading (e.g., "f" and "ph") but have different meanings or connotations, the letter selector selects the letter with the more appropriate meaning for the selected name characteristics. In one implementation, when a selected phoneme is not present in the target language, the letter selector requests a new phoneme from the phoneme selector that is close to the unavailable phoneme, and then selects a letter for the replacement phoneme. In an implementation where the target length indicates a number of letters, the letter selector 2040 uses the target length to select letters for selected phonemes and to select filler letters as needed. The arranged sequence of letters is a candidate name.

The name filter 2050 compares the candidate name to restrictions to avoid undesirable names. The name filter 2050 uses restriction rules for the target language and country to avoid words or letter combinations that would have unintentional connotations. Examples of restrictions include, but are not limited to: inappropriate slang, vulgar terms, body parts, inappropriate cultural words, proper names, and trademarks. If the candidate name is acceptable, the name filter 2050 approves the name. If not, the name filter 2050 rejects the name and requests the name generator 2000 to generate a new name. In one implementation, the name filter 2050 returns the rejected name to the component of the name generator 2000 where the problematic combination arose (e.g., to the letter selector 2040 for letter selection problems).

After the name filter 2050 has approved the name, the name generator 2000 presents the combination of letters to the user through the name interface 2010 for approval. The name generator 2000 can also generate a series of candidate names through different combinations of phonemes and letters (e.g., changing filler phonemes, changing phoneme sequence, changing letter selections, etc.).

Figure 3:
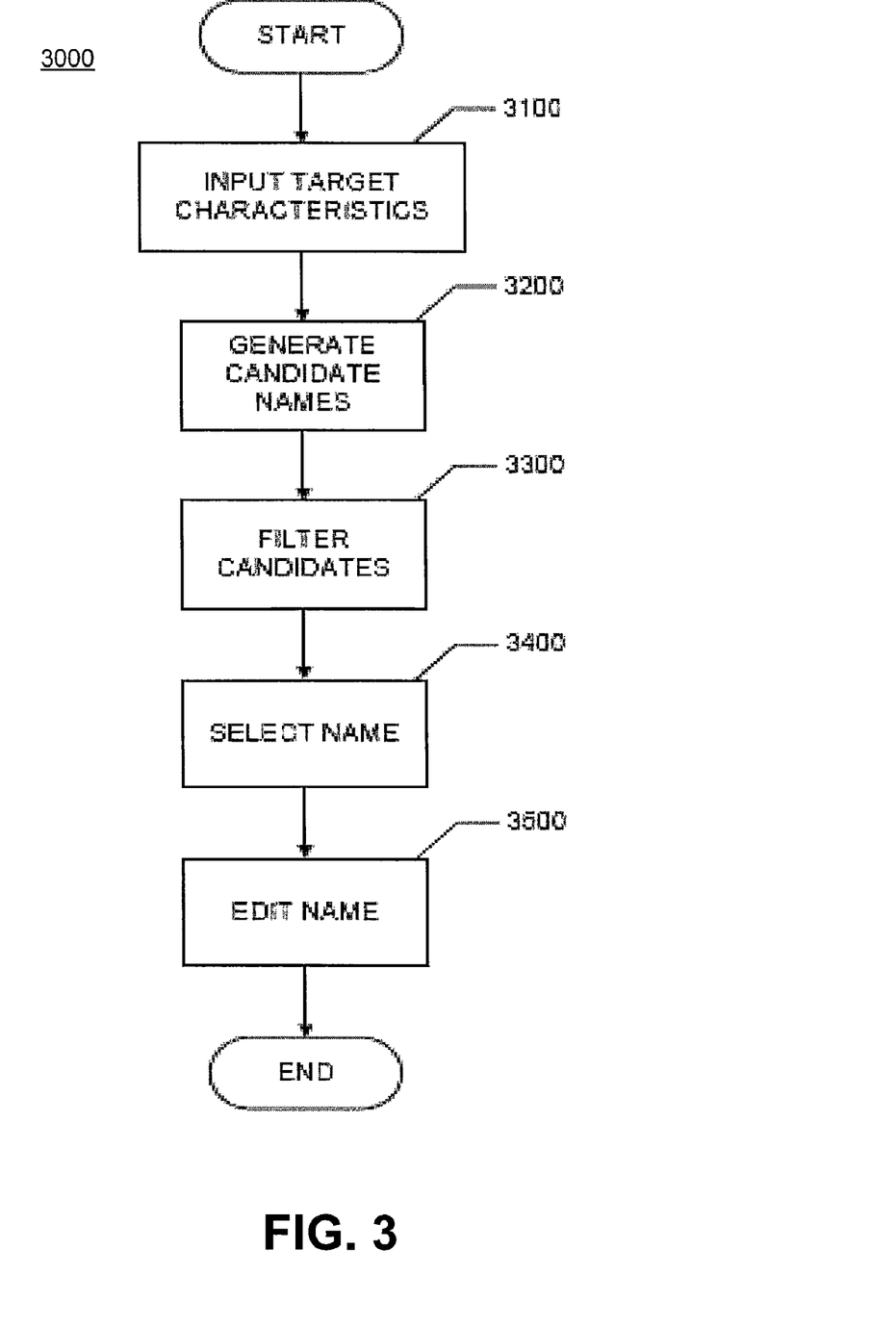
FIG. 3 shows a flowchart of one implementation of generating and selecting a name.

FIG. 3 shows a flowchart 3000 of one implementation of generating and selecting a name. Initially, a computer system has a name generator software application program stored and loaded for execution. The computer system also stores a rule dictionary.

A user inputs target characteristics and information for a name to be generated, block 3100. The user uses the user interface of the computer system and the name generator to select one or more name characteristics (e.g., from those presented by the name generator) and values for the selected characteristics. The user also inputs configuration information, such as target length, target language, target country, and number of candidate names.

The name generator generates the indicated number of candidate names, block 3200. The name generator uses the received characteristics and configuration information to select phonemes and letters based on rules in the rule dictionary. The name generator repeats the process to generate the indicated number of names. When multiple target languages are selected, the name generator generates a different version of each generated name for each selected language (e.g., when the user requests five names for three languages, three versions of each of five names are generated—15 total).

The name generator filters the candidate names, block 3300. The name generator uses a set of restrictions to avoid candidate names that would be inappropriate or undesirable for the target language and target country. The name generator rejects names that are filtered out as inappropriate. The name generator generates additional names to replace those rejected. In another implementation, the name generator filters each name as it is generated (combining blocks 3200 and 3300).

The name generator presents the approved candidate names to the user and the user selects one of the names, block 3400. The user selects one of the names through the user interface of the computer system and the name generator.

The user can then edit the selected name, block 3500. The user edits the name through the computer system.

In one implementation, the name generator provides an interactive editing interface. The name generator displays a characteristic profile of the name, such as showing a value or representation in a range for characteristics. As the user edits the name, the name generator updates the profile to reflect the changes to the phonemes of the name and indicating potential problems raised by the filter of the name generator. The user can also adjust the profile to generate a new name. In another implementation, the user can start from this editing interface to interactively design a name. In another implementation, the name generator includes a function to generate names similar to one entered into the name interface (e.g., "more like this"). When the user selects that operation, the name generator generates additional names using the profile of the provided name. In another implementation, the user can enter a name to generate a profile and then modify the profile to generate new names.

In another implementation, the name generator is accessible through a network server. In one implementation, a server stores and executes a name generator service for remote clients, such as through a web service or as a centralized server or broker.

Figure 4:
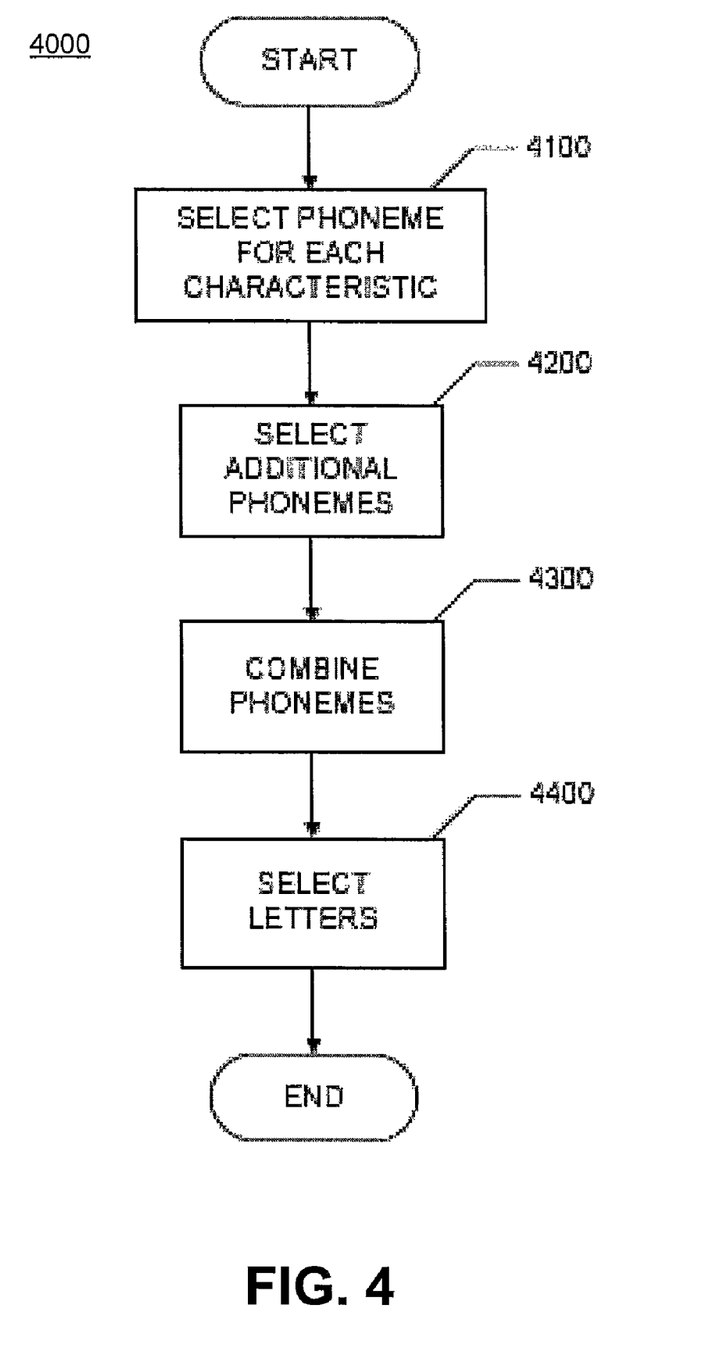
FIG. 4 shows a flowchart of one implementation of generating a name.

FIG. 4 shows a flowchart 4000 of one implementation of generating a name. Initially, a computer system has a name generator software application program stored and loaded for execution. The computer system also stores a rule dictionary. The computer system has received or generated a selection of one or more characteristics and corresponding values and configuration information for a name (e.g., as in block 3100 of FIG. 3).

The name generator selects a characteristic phoneme for each selected characteristic, block 4100. The name generator selects from the rule dictionary a rule for a characteristic. The name generator selects one of the phonemes indicated by the selected rule based upon the received value for the corresponding characteristic. The name generator discards repeated phonemes.

The name generator selects additional filler phonemes as indicated by the configuration information, block 4200. The configuration information includes a target length indicating the number of phonemes the name is to include. If the number of characteristic phonemes selected for selected characteristics is less than the target length, the name generator selects additional filler phonemes (e.g., pseudo-random selection, adding discarded repeat phonemes) to match the target length. If the number of characteristic phonemes is greater than the target length, the name generator eliminates phonemes (e.g., pseudo-random selection, or using weighting or priority information from the configuration information).

The name generator combines the selected characteristic phonemes and filler phonemes, block 4300. The name generator arranges the selected phonemes to form a name. The name generator uses pseudo-random selection to arrange the phonemes. Alternatively, the name generator uses pronunciation or spelling rules associated with the target language indicated in the configuration information.

The name generator selects letters for the selected phonemes, block 4400. The name generator selects one or more letters for each phoneme using spelling rules associated with the target language. The name generator uses the selected characteristics to select one letter or character over another to select among symbols that have the same phoneme but different meanings. In another implementation, the name generator also uses the target length to select letters (e.g., to select one letter versus two letters for a phoneme).

The name generator uses the selected combination of letters as a candidate name (e.g., as the output of block 3200 in FIG. 3).

Figure 5:
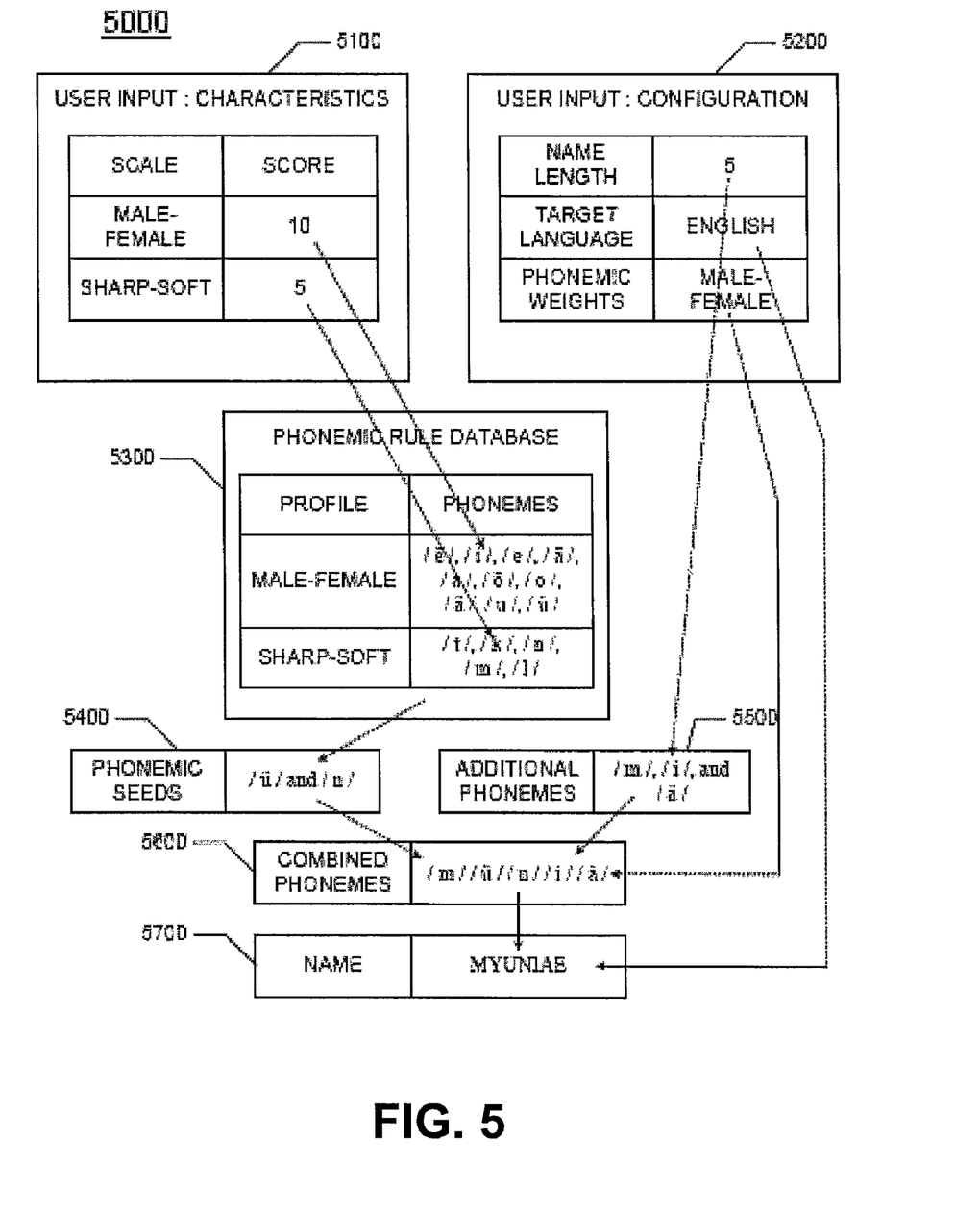
FIG. 5 is a representation of an example of generating the name "MYUNIAE" from selected characteristics.

FIG. 5 is a representation 5000 of an example of generating the name "MYUNIAE" from selected characteristics. The blocks 5100-5700 represent information and data. The dashed arrows indicate the relationship between items of information that influence decisions.

Block 5100 represents user input for name characteristics indicating a value of 10 (on a scale of 1 to 10) for the characteristic "male-female" (highly female) and a value of 5 for "sharp-soft" (in the middle between sharp and soft).

Block 5200 represents user input for configuration information indicating a target name length of 5 phonemes, a target language of English, and a phonemic weight for "male-female" (indicating to favor the phoneme selected for the characteristic "male-female" in placement).

Block 5300 represents rules in a rule dictionary in a database. Because the selected characteristics are "male-female" and "sharp-soft", the referenced rules are for these characteristics. The rules show the correlation between characteristics and sets of phonemes.

Block 5400 represents the characteristic phonemes selected for the selected characteristics using the referenced rules and values. Because the value for the selected characteristic of "male-female" is 10, the most "female" of the phonemes indicated by the rule for "male-female" is selected, that is, the phoneme /ü/. Similarly, the phoneme /n/ is selected for the characteristic "sharp-soft" as being the phoneme in the middle of the phonemes indicated by the "sharp-soft" rule (corresponding to the value of 5 on a scale of 1 to 10).

Block 5500 represents additional filler phonemes selected randomly. Because the target name length is 5 phonemes, and two characteristic phonemes have been selected (block 5400), three filler phonemes are selected, /m/, /i/, and /ä/.

Block 5600 represents the combination of the selected characteristic and filler phonemes. Because the configuration information for phonemic weight indicates to give more importance to the phoneme selected for the "male-female" characteristic, the phoneme /ü/ is placed near the beginning of the combination. The other phonemes are arranged randomly.

Block 5700 represents the selection of letters for the selected arrangement of phonemes. Because the target language is English, letters are selected based on English spelling rules (e.g., selecting letters 'y' and 'u' corresponding to the phoneme /ü/.

Variations of the name generator can also be used to analyze names and text.

In one implementation, the name generator also provides a name evaluator. The user provides a name to the name evaluator and the name evaluator builds a profile of the name. The characteristic profile of the name shows how the phonemes of the name reflect characteristics from the rule dictionary of the name generator. In one implementation, a scale is shown for each characteristic with an indicator showing where the name falls on the scale. The name evaluator determines the phonemes in the name. If appropriate, the user provides language information to the name evaluator. The name evaluator then references the rule dictionary used by the name generator to find what characteristics are associated with each phoneme in the name and how (e.g., where the phoneme is in the ordered list for a characteristic). The name evaluator combines the results for all the phonemes to build the profile (e.g., averaging results for each characteristic). In another implementation, the profile also provides an estimate of whether the name would be received negatively or not in various languages, countries, or cultures (e.g., as a table, list, or through interactive selection). In one implementation, the name evaluator is provided as part of the editing interface of the name generator. In another implementation, the name evaluator is provided as a stand-alone application program and operates independently of the name generator.

In another implementation, a text evaluator receives a text file (or other text source) and builds a profile for the received text. The profile indicates characteristics of the text, similar to the name evaluator described above. The text evaluator evaluates the words used in the text to build the text profile. The text evaluator uses characteristics selected by the user to build the profile, such as active versus passive. The text evaluator also provide a profile of portions of the text over time, such as indicating which parts of the text appear more active or emotional or which parts address a topic or area (e.g., using a color scale on a linear graph of the text). Based on the profile information, the text evaluator can suggest where certain dramatic events occur (e.g., character introduction or climax) and an evaluation of the tone of the conclusion ("upbeat" or "downbeat"). The text evaluator can also perform or use other text analysis techniques such as introduction of new words, counting occurrences of words, sentence length, and so on. An implementation could be built into a word processor or editing tool for on-demand or real-time analysis and feedback.

The various implementations of the invention are realized in electronic hardware, computer software, or combinations of these technologies. Some implementations include one or more computer programs executed by a programmable processor or computer. For example, referring to FIG. 1A, in one implementation, the computer system 1000 includes one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using text names, sound analysis can be used to receive input as audio (e.g., from user speech) or output names as audio as well. In addition, rather than phoneme analysis, other analysis can also be used, such as visual impact of letters in a target language. Accordingly, the present invention is not limited to only those implementations described above.

The invention claimed is:

1. A method of generating a profile of a word, the method comprising:
   receiving the word including at least one phoneme;
   determining the at least one phoneme in the word;
   selecting at least one characteristic for each of the determined at least one phoneme in the word using a dictionary of sound symbolism rules;
   generating the profile of the word by combining all of the selected at least one characteristic for the at least one phoneme;
   receiving language information for the word;
   evaluating the profile of the word and the language information to produce a first scale; and
   generating an estimate of whether the word would be received negatively in various languages, countries, and cultures using the first scale.

2. The method of claim 1, wherein selecting at least one characteristic for each of the determined at least one phoneme in the word comprises determining a position of said each phoneme within a scale of phonemes for said each characteristic.

3. The method of claim 1, wherein combining all of the selected at least one characteristic for the at least one phoneme comprises:
   scaling each of the at least one characteristic into a value; and
   averaging the value of all of the selected at least one characteristic for the at least one phoneme.

4. The method of claim 1,
   wherein the word is a string of text, and
   wherein evaluating the profile of the word comprises determining a tone of the string of text.

5. The method of claim 1, wherein evaluating the profile of the word comprises providing a profile of portions of the word over time.

6. The method of claim 5, wherein providing a profile of portions of the word over time comprises providing which parts of the word address a topic using a second scale on a linear graph of the word.

7. The method of claim 1, wherein each characteristic of the selected at least one characteristic includes a position of said each phoneme in an ordered list of phonemes for said each characteristic.

8. The method of claim 1, wherein the word is a name for a character, creature, or item in a computer game.

9. The method of claim 8, wherein the profile of the word is a characteristic that is suggestive of the name for the character, creature, or item in the computer game.

10. A non-transitory computer-readable storage medium storing a computer program for generating a profile of a word, the program comprising executable instructions that cause a computer to:
   receive the word including at least one phoneme;
   determine the at least one phoneme in the word;
   select at least one characteristic for each of the determined at least one phoneme in the word using a dictionary of sound symbolism rules;
   generate the profile of the word by combining all of the selected at least one characteristic for the at least one phoneme;
   receive language information for the word;
   evaluate the profile of the word and the language information to produce a first scale; and
   generate an estimate of whether the word would be received negatively in various languages, countries, and cultures using the first scale.

11. The non-transitory computer-readable storage medium of claim 10, wherein the word is a name for a character, creature, or item in a computer game.

12. The non-transitory computer-readable storage medium of claim 11, wherein the profile of the word is a characteristic that is suggestive of the name for the character, creature, or item in the computer game.

13. The non-transitory computer-readable storage medium of claim 10, wherein executable instructions that cause a computer to evaluate the profile of the word comprises executable instructions that cause a computer to provide a profile of portions of the word over time.

14. The non-transitory computer-readable storage medium of claim 13, wherein executable instructions that cause a computer to provide a profile of portions of the word over time comprises executable instructions that cause a computer to provide which parts of the word address a topic using a second scale on a linear graph of the word.

* * * * *